United States Patent
Rejman et al.

(10) Patent No.: US 11,211,657 B2
(45) Date of Patent: Dec. 28, 2021

(54) BATTERY PACK FOR A HAND-HELD POWER TOOL

(71) Applicant: Robert Bosch GmbH, Stuttgart (DE)

(72) Inventors: Marcin Rejman, Waiblingen (DE); Christoph Klee, Stuttgart (DE); Mickael Segret, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/080,793

(22) PCT Filed: Feb. 21, 2017

(86) PCT No.: PCT/EP2017/053879
§ 371 (c)(1),
(2) Date: Aug. 29, 2018

(87) PCT Pub. No.: WO2017/148739
PCT Pub. Date: Sep. 8, 2017

(65) Prior Publication Data
US 2019/0027720 A1  Jan. 24, 2019

(30) Foreign Application Priority Data
Mar. 2, 2016 (DE) .......................... 102016203427.8

(51) Int. Cl.
*H01M 50/284* (2021.01)
*H01M 50/20* (2021.01)
(Continued)

(52) U.S. Cl.
CPC .............. *H01M 50/20* (2021.01); *B25F 5/006* (2013.01); *B25F 5/02* (2013.01);
(Continued)

(58) Field of Classification Search
CPC ............ H01M 2/1077; H01M 2/1022; H01M 2220/30; H01M 50/284
See application file for complete search history.

(56) References Cited

U.S. PATENT DOCUMENTS 8,440,344 B2 * 5/2013 Ahn .................... H01M 2/1022
429/161
8,708,619 B2 * 4/2014 Rozycki ................. B23B 45/00
30/451

(Continued)

FOREIGN PATENT DOCUMENTS

CN      107431158 A    12/2017
DE   102016203422 A1    9/2016

(Continued)

OTHER PUBLICATIONS

International Search Report dated May 15, 2017 of the corresponding International Application PCT/EP2017/053879 filed Feb. 21, 2017.

*Primary Examiner* — Ula C Ruddock
*Assistant Examiner* — Thomas H. Parsons
(74) *Attorney, Agent, or Firm* — Norton Rose Fulbright US LLP; Gerard Messina

(57) ABSTRACT

A battery pack for a handheld power tool has a battery pack housing, at least one cell holder having at least one battery cell, and a battery pack electronics unit that includes at least one flexible, in particular bendable, circuit board.

21 Claims, 6 Drawing Sheets

(51) Int. Cl.
*B25F 5/00* (2006.01)
*B25F 5/02* (2006.01)
*H01M 10/0525* (2010.01)
*H01M 50/213* (2021.01)
*H01M 10/48* (2006.01)

(52) U.S. Cl.
CPC ..... *H01M 10/0525* (2013.01); *H01M 50/284* (2021.01); *H01M 10/48* (2013.01); *H01M 50/213* (2021.01); *H01M 2220/30* (2013.01)

(56) References Cited

U.S. PATENT DOCUMENTS

| | | | |
|---|---|---|---|
| 8,758,919 B2* | 6/2014 | Taga | H01M 2/1055 |
| | | | 429/100 |
| 10,637,109 B2* | 4/2020 | Rejman | H01M 10/482 |
| 2002/0182480 A1 | 12/2002 | Hanauer et al. | |
| 2006/0164032 A1 | 7/2006 | Johnson et al. | |
| 2009/0061302 A1 | 3/2009 | Scott et al. | |
| 2013/0330576 A1 | 12/2013 | Kolden et al. | |

FOREIGN PATENT DOCUMENTS

| | | | |
|---|---|---|---|
| JP | 2007087780 A | | 4/2007 |
| JP | 2007508681 A | | 4/2007 |
| JP | 2009289578 A | | 12/2009 |
| JP | 2010146879 A | | 7/2010 |
| JP | 2011527492 A | | 10/2011 |
| JP | 2014023283 A | | 2/2014 |
| WO | WO2016142254 | * | 9/2016 |

* cited by examiner

BATTERY PACK FOR A HAND-HELD POWER TOOL

CROSS-REFERENCE TO RELATED APPLICATIONS

The present application is the national stage of International Pat. App. No. PCT/EP2017/053879 filed Feb. 21, 2017, and claims priority under 35 U.S.C. § 119 to DE 10 2016 203 427.8, filed in the Federal Republic of Germany on Mar. 2, 2016, the content of each of which are incorporated herein by reference in their entireties.

FIELD OF THE INVENTION

The present invention relates to battery tool with a battery pack and to a battery pack for a handheld tool.

BACKGROUND

Electrical handheld tools are known in principle, and are supplied with power via a mains connection. Alternatively, battery-powered devices enable a high degree of flexibility during work, in particular because they are independent of mains power. In this way, for example outdoor work can also easily be performed, so that battery packs are often used when operating a handheld power tool.

Such battery packs are known in principle and, as a rule, have a plurality of rechargeable accumulators connected in parallel and/or in series, for example three cylindrical lithium-ion cells connected in series, each having for example 3.6 V, with an overall voltage of 10.8 V. In the context of the present application, a battery pack is thus, for example, a packet of accumulators, preferably made up of a plurality of accumulator cells connected together electrically, that can store electrical energy that provides the energy required for the operation of a handheld power tool, and can be exchangeably housed in a chamber or an interface or the like of the handheld power tool.

The battery cell is to be connected to the battery pack electronics unit, and, when there is a plurality of battery cells, these are to be connected to one another on the one hand and to the battery pack electronics unit on the other hand. Here, for the series connection, in part so-called conductor plates and/or cables are used that are soldered to the respective complementary poles of a battery cell and connect these to one another. The conductor plates and/or cables are connected to the cell connectors via conductive connections, usually soldered or welded connections.

A disadvantage of the described existing art is that the connection of the cells to one another requires complex and time-consuming assembly steps, and the type of connection achieved is not automatically resistant to strong mechanical stress, so that the assembly process is expensive and cost-intensive, and the connections are susceptible to failure.

SUMMARY

An object of the present invention is to remedy the disadvantages noted above and to provide a battery pack for a handheld power tool of the type mentioned above modified so that the electrical connections inside the battery pack and the assembly of the battery pack are simplified. In addition, the battery pack should be easy to install, and constructed in a simple, flexible, and low-cost a manner as possible.

According to an example embodiment of the present invention, a battery pack for a handheld power tool has a battery pack housing, at least one cell holder accepting at least one battery cell, and a battery pack electronics unit that includes at least one flexible, in particular bendable, circuit board. Preferably, the flexible circuit board has a bending stiffness that at least in some regions is realized such that a bending deformation of the flexible circuit board is possible in the installed state. Here it is advantageous if the bending deformation of the flexible circuit board can take place in such a way that a midplane of the circuit board can be deformed in the region of the bending deformation by an angle $\varphi$ relative to an original position. In this way, it can be ensured that the flexible circuit board can be variably adapted to the geometrical shape of the battery pack housing or of the cell holder. In addition, a plurality of different electrical components can be positioned on the flexible circuit board that normally are situated spatially separate from one another, such as various actuating elements, indicator lights, voltage taps, temperature sensors, various functional groups of the battery pack electronics unit, antennas for a radial module, connections for a wireless charging module, and/or connections to a charging coil. Thus, through the present invention, the complexity of the cabling and/or the number of soldered connections inside the battery pack housing can be reduced, thus reducing the assembly outlay and therefore the costs, and making the battery pack more robust and longer-lived.

Alternatively, the cell holder can have a plurality of battery cells connected to one another in a parallel circuit and/or in a series circuit. In a preferred example embodiment, the battery cells each have a cladding surface running parallel to a longitudinal axis, the cladding surface being bounded by two end faces standing perpendicular to the longitudinal axis, and the cladding surface and the end faces forming an outer sheath of the battery cells.

In addition, the battery pack electronics unit includes at least one circuit board having contact elements for producing an electrical connection between the battery pack and the handheld power tool.

In general, circuit boards are made of a base material that has a multiplicity of individual conductor paths or contact surfaces. The conductor paths are usually supported by a protective layer, for example a solder resist, that extends over the entire circuit board surface except for the terminal contacts or other contact means. Circuit boards are suitable as bearers for electronic components, and in general are provided with the protective layer on the free contact surfaces and in the copper-plated bores before being equipped, immediately after the production of the contact surfaces or printed conductors; the protective layer is intended to guarantee that all the terminal contacts or other contact means that are to be formed during the equipping satisfy all electrical and mechanical requirements.

According to an example embodiment of the present invention, at least one contact corresponding to the battery cell is provided on the flexible circuit board, the contact electrically contacting a corresponding battery cell in such a way that a contacting of the individual battery cells with the battery pack electronics unit via an additional conductor can be omitted. In order to achieve such a contacting, the contact for the battery cell is advantageously realized in the form of a bendable contact tongue of the flexible circuit board, preferably in the form of two bendable contact tongues, situated opposite one another, of the flexible circuit board, the contact being capable of being deformed by the angle $\varphi$ relative to an original position in the region of the bending deformation. Here, the angle φ has a value between 10° and 200°, more preferably between 30° and 190°, particularly preferably 180°.

Advantageously, the battery pack electronics unit has a microcontroller or an alternative circuit for monitoring individual cell voltages, the microcontroller being electrically connected to the contact and being configured to acquire at least one operating parameter of the individual battery cell via the at least one contact. This connection can be direct, or can also be produced via additional components for signal preparation. Via the microcontroller of the battery pack electronics unit, inter alia the state of charge can be monitored via the voltage of the individual battery cells, and can be controlled using a corresponding regulating unit. Through the individual voltage monitoring, on the basis of the connection between the battery cells and the flexible circuit board, it can be determined whether all battery cells have been properly charged, or whether a charge voltage has been reached that the battery cells are not capable of absorbing. In this way, the battery pack has good serviceability over a long period of time.

In an advantageous example embodiment, the cell holder has at least one opening for guiding the contact tongue through into the cell holder; here, individual battery cells are connected directly to the flexible circuit board via the contact tongue. Preferably, a tool is used to introduce the contact tongue into the opening of the cell holder in a cell channel, and when the battery cell is introduced the tongue is bent by about 180°. In this process, what is essential is the formation of the contact surface, in particular a copper surface, on the contact tongue. A large contact surface results in an increased plastic deformation during the bending process, in which the contact tongue rolls in such a way that the end points in the direction of the cell channel wall, which can have a disadvantageous effect on the later insertion of the battery cells. If the plastic deformation is too small, then after the insertion the contact tongue bends back into its initial position, so that the contact is also situated close to the cell channel wall, and/or remains deformed only in the region of the tip.

This is remedied by a contact surface that is formed by a metal surface at least in some regions, in particular at the location at which the contact tongue is to be bent, the contact surface being at least to a great extent electrically insulated by a protective layer, at least in the regions of the bending deformation. According to an example, the contact tongue of the flexible circuit board is fashioned in such a way that on the one hand an elastic deformation of the flexible circuit board is possible, and on the other hand in regions of the bending deformation the contact tongue has the contact surface in the form of a metal surface having a largely electrically insulated protective layer that is fashioned to define a mechanical weak point of the flexible circuit board, in particular through a reduction in the cross-section of the contact surface in the region of the bending deformation. Correspondingly, it is provided that in regions of the bending deformation the contact surface first undergoes a widening of its cross-section, then a reduction of the cross-section, and subsequently a widening of the cross-section. The wide contact surface has higher elastic deformation reserves, while the cross-sectional reduction, as a mechanical weak point, helps to define the region of the bending deformation. The contact surface on the contact tongue is in this way plastically deformable in the region of the bending deformation, while it remains largely elastic in the other regions on the contact tongue and the flexible circuit board.

In addition, in an example, the transition between a region of the contact tongue on which the contact surface does not have a protective layer and the region of the contact tongue that is provided with a protective layer is realized such that the end of the protective layer and the cross-sectional widening of the contact surface of the contact tongue do not take place at the same time, but rather the protective layer partly overlaps the contact surface of the contact tongue. In a preferred example embodiment, the contour of the protective layer is not a straight line perpendicular to the longitudinal direction of the contact tongue, but rather is curved. In this way, there is not a sharp transition of the bending stiffness, and thus also no exposed mechanical weak point. For the same reasons, in an example embodiment, the contact surface under the protective layer does not end along a line running perpendicular to the longitudinal direction of the contact tongue, but rather along a curved line. In this way, on the one hand there is a gradual increase of the contact surface in the longitudinal direction of the contact tongue, but on the other hand there is also a gradual decrease of the protective layer.

In particular, in an example, the flexible circuit board has two contact tongues for each battery cell, the contact tongues advantageously being introduced through oppositely situated openings of the cell holder in opposite sides of the cell channel, so that when the battery cell is introduced, an equal tension arises in both directions on the flexible circuit board. Advantageously, the advantage of the symmetrical tension arises even when one of the two contact tongues does not have a contact surface. In a preferred example embodiment, the contact tongue is clamped, welded, or soldered to the battery cell for electrical contacting. Alternatively, it would also be possible to coat the contact surfaces of the contact tongue in such a way that a cold welding or a similar material bond would take place in pressure contact with the battery cell. In general, such an embodiment of the contact as a contact tongue threaded through the openings, and its mechanical and electrical coupling with a battery cell, has the advantage that the contact tongue is mounted so as to be clamped by the battery cell in the region of the cell channel, and in this way in particular vibrations can be compensated that occur in particular in impact drill devices or drill hammers.

Alternatively, it is also possible that at least one contact of the flexible circuit board is not threaded through an opening in the cell channel of the cell holder and there pressed onto the battery cell, but rather a break is located in the cell holder in the region of each cell channel, through which the contact is introduced as centrally as possible into the cell channel for the contacting of the battery cell.

In a particularly preferred example embodiment, the at least one battery cell essentially has no insulating sheath, or has an insulating sheath only in some regions, the insulating sheath having at least one opening at least in the region in which the contact contacts the battery cell.

In an advantageous example embodiment, the contacting between a plurality of battery cells takes place in the manner described above, the cell connectors being situated either on one side, in combination with welded connections to the positive pole of the battery cell, or being situated on both sides.

In a particularly preferred example embodiment, the flexible circuit board is a circuit board printed on one side, because such a circuit board is generally more economical to produce than a circuit board printed on both sides. In the case of a flexible circuit board printed on one side, either the contact or the cell connectors and/or regions thereof can be provided with indicators and an actuating element.

In an advantageous example embodiment, the flexible circuit board has at least one recess, preferably a plurality of recesses, the cell holder having at least one corresponding positioning element, preferably a plurality of corresponding positioning elements, the positioning element engaging, in an installed state, in the recess of the flexible circuit board in such a way that the position of the flexible circuit board on the cell holder is secured.

Advantageously, in an example, the flexible circuit board has a plurality of electronic components, in particular at least one actuating element, at least one indicator light, at least one temperature sensor, and/or other surface-mounted devices. Surface-mounted devices, or SMD, make it possible to increase the equipping density on a circuit board and to expand it almost arbitrarily, e.g., by connecting an inductive charge module having additional current and signal lines.

In addition, individual voltage monitoring devices are usually connected to the battery pack electronics unit via an input filter that contains an electrical resistance. Due to their high capacitance and low internal resistance, battery cells can provide a large current. So that no malfunction will occur in case of error, e.g., due to contamination with metal dust, in an example, the input filter resistors, which at the same time attenuate this current, are advantageously situate as close to the cell taps as possible. A flexible circuit board enables equipping with various surface mounted components, such as the named resistors, sensing devices as actuating elements, and/or indicator lights, for example in the form of LEDs.

In principle, various specific embodiments of a cell holder can be used inside the battery pack, so that battery cells having different diameters and lengths can be accommodated, and the use of the cell holder in different battery packs can be ensured.

As battery cells for a battery pack, various accumulator types having different materials can be used, such as lithium-ion (Li-ion), nickel-cadmium (NiCd), nickel-metal hydride (NiMH), or lithium-polymer (LiPo); different constructive shapes can be used, such as round, prismatic, or cornered shapes; or other alternative systems, such as fuel cells, can be used. Preferably, in particular lithium-ion cells are used, because with lithium-ion cells it is in particular possible to combine a plurality of battery cells to form battery cell blocks in which a plurality of battery cells are connected in a parallel circuit. Here it is particularly advantageous if the cell holder can accept battery cells having different diameters and lengths, so that as a result the cell holder, or cell bearer, can be used in different battery packs.

Via the described optimized embodiment of the battery pack according to the present invention having a flexible circuit board, in particular the assembly of the battery pack, or of the cell holder, and the positioning and assembly of various components, in particular of the cell holder, the circuit boards, the cable guides, the cell connectors, and/or the electronics unit fuses, inside the battery pack housing can be significantly improved.

The battery pack according to the present invention can also be provided in a tool system. Correspondingly, a handheld power tool that includes a battery pack detachably connectable to the handheld power tool forms a further subject matter of the present invention, the handheld power tool having at least one corresponding counter-contact element for electrical and/or mechanical connection to the interface of the battery pack, and the battery pack being electrically connected to the handheld power tool in the installed state.

In general, a handheld power tool is to be understood as any handheld power tool having a tool holder that can be driven by a drive motor, for example can be set into rotation and/or isolation, such as a rod screwdriver, a battery drill, impact drill machines, multifunction tools, handheld vacuum cleaners, mixers, and/or drill screwdrivers. In the present context, the transmission of electrical energy is to be understood in particular as meaning that the handheld power tool is provided with energy by a battery and/or a power cable connection.

Quite generally, an electric motor is to be understood as any type of electrical consumer, such as an EC motor, a linear drive, a lamp, a pump, a ventilator, a compressor, or the like. The advantage of the brushless DC motors is, inter alia, that on the one hand they are nearly maintenance-free, and due to their high efficiency they enable longer working time per battery charge during battery operation, so that they are particularly efficient. In addition, handheld power tools having EC motors can be made very compact and light, and it is particularly advantageous that there is also less heat loss, so that the devices do not heat up as much as comparable devices, and therefore have longer life.

Further features, possible uses, and advantages of the present invention result from the following description of the exemplary embodiments of the present invention with reference to the figures. The depicted features have only a descriptive character, and can also be used in combination with features of other further developments described above, and are not intended to limit the present invention in any way.

In the following, the present invention is explained in more detail on the basis of preferred exemplary embodiments, identical reference characters being used for identical features. The drawings are schematic.

DETAILED DESCRIPTION

Figure 1:
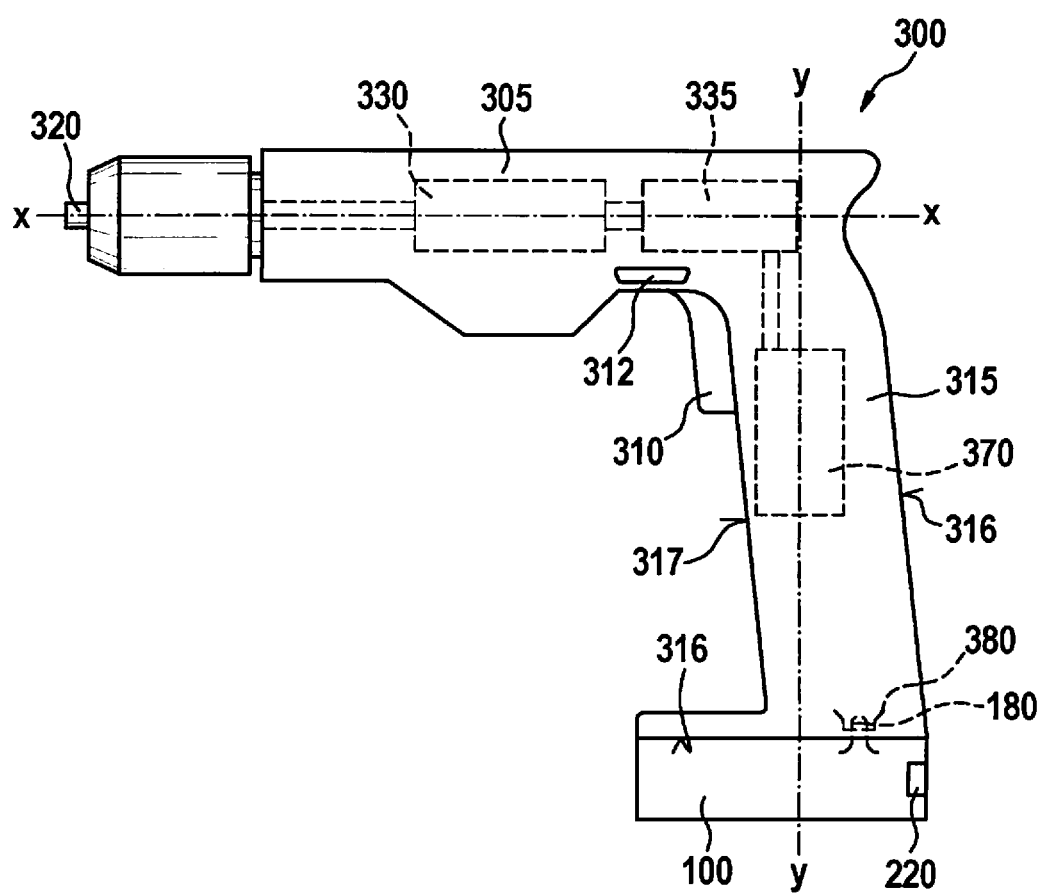
FIG. 1 shows, as an example, a view of a handheld power tool having a battery pack according to an example embodiment of the present invention.

FIG. 1 shows an electrical device fashioned as handheld power tool 300, realized for example as a battery-powered drill screwdriver. Correspondingly, in the depicted specific embodiment handheld power tool 300 is mechanically and electrically connected to a battery pack 100 in order to supply power independent of the mains network. However, the present invention is not limited to battery-powered drill screwdrivers, but rather can be used in various handheld power tools 300, regardless of whether they are operated, as shown, with a battery pack 100 as a mains-independent power supply, or are operated with a mains-dependent power supply. Handheld power tool 300 has a gear mechanism 330 situated in a housing 305 for transmitting a torque produced by a drive motor 335 to a driveshaft that rotates about an axis x, to which shaft a tool chuck 320 for a tool (not shown) is fastened; power tool 300 also has a handle 315. Inside housing 305, there is situated an electronics unit 370 that stands in electronic and mechanical contact with drive motor 335 and/or with gear mechanism 330. Handle 315 acts as a support surface for the hand of an operator of the handheld power tool 300, and generally has a longitudinal axis y, a front side 317 that points along an axis x in the direction of tool chuck 320, a rear side 316, and two side surfaces 318.

In the area of handle 315, there is situated a first operating element 310 for supplying energy to drive motor 335, first operating element 310 protruding from housing 305 so as to be manually accessible by the user, so that, in a known manner, through a pressure movement of first operating element 310, a controlling and/or regulation of the drive motor can be enabled, preferably as a function of the path of displacement of first operating element 310, and the supply voltage to drive motor 335 can also be switched on and/or off. In addition, handheld power tool 300 has a second operating element 312 in the form of a sliding switch for setting the direction of rotation of drive motor 335 of handheld power tool 300. Second operating element 312 is situated so as to be displaceable perpendicular to axis of rotation x of the driveshaft, in particular of tool chuck 320 of handheld power tool 300, so that upon actuation the second operating element 312 can be moved back and forth between a first position, a second position, and a third position. Here, the first and second position each determine a direction of rotation of the drive motor. In this way, the user of handheld power tool 300 can recognize, already on the basis of the positions of second operating element 312, the operating mode in which handheld power tool 300 is operating. In addition, the second switching element has a third position, for example a center position, between the first position and the second position, such that in the third position there is an electrical, electromechanical, and/or mechanical interruption of the motor current. In this way for example the operation of first switching element 310 can be mechanically blocked, second operating element 312 acting, when moved into a third position, in a locking manner on first switching element 310. Here, second operating element 312 can be realized, as shown, as a sliding switch, or alternatively as a rocker switch.

First operating element 310 and second operating element 312 are situated along axis of rotation x in such a way that it is possible to actuate both first and second operating element 310, 312 using the index finger or middle finger. Here, the distance between first operating element 310 and second operating element 312 is selected such that one-handed operation of handheld power tool 300 is possible. In addition, both operating elements 310, 312 are situated in a region below axis of rotation x and protrude from housing 305.

In the position shown in FIG. 1, battery pack 100 is fastened on handle 315 of handheld power tool 300, and is locked by a lock. The situation of battery pack 100 below handle 315 does not disturb the operation of handheld power tool 300. The lock, not shown in detail, includes, inter alia, a locking element and an actuator 220. By actuating the actuator 220, battery pack 100 can be detached from handle 315 of handheld power tool 300. In addition, handheld power tool 300 has an interface 380.

Battery pack 100 shown in FIG. 1 is realized as a sliding battery pack, and has an interface 180 that corresponds to interface 380 of handheld power tool 300. Alternatively to the sliding battery pack, a realization as a rotating or pivoting battery pack is also possible, in which battery pack 100 can be detachably arrested on housing 305 of handheld power tool 300 on the side opposite the pivot axis by locking, screwing, clamping, or tensioning. In this way, the possibility of the battery pack falling off of housing 305 can effectively be counteracted.

For the detachable attachment of battery pack 100 on a handheld power tool 300, or to a charge device, battery pack 100 has an interface 180 for detachable mechanical and electrical connection to a corresponding interface 380 of handheld power tool 300 or a corresponding interface of the charge device. During the attachment of battery pack 100, a receptacle, e.g., guide grooves and guide ribs, of handheld power tool 300 or of the charge device, for accepting the corresponding guide elements of battery 100, are brought into engagement therewith, battery pack 100 being introduced along the receptacle and interface 180 of battery pack 100 being pushed into the corresponding interface 380 of handheld power tool 300 or the corresponding interface of the charge device. Via interfaces 180, 380, battery pack 100 can be assigned to handheld power tool 300 and/or to the charge device.

In order to lock battery pack 100 on handle 315 of handheld power tool 300, battery pack 100 is pushed along handle 315, along an outer surface of handle 315 oriented essentially perpendicular to longitudinal direction y of handle 315. In the position shown in FIG. 1, battery pack 100 is locked to handle 315 by a lock that includes, inter alia, a locking element 210 shown in FIG. 2 and an actuator 220. By actuating the actuator 220, battery pack 100 can be detached from handle 315 of handheld power tool 300. After battery pack 100 is unlocked, it can be separated from handle 315. When battery pack 100 is attached to a handheld power tool 300, locking element 210 is brought into engagement with a corresponding receptacle (not shown in more detail) in handle 315 of handheld power tool 300.

Figure 2:
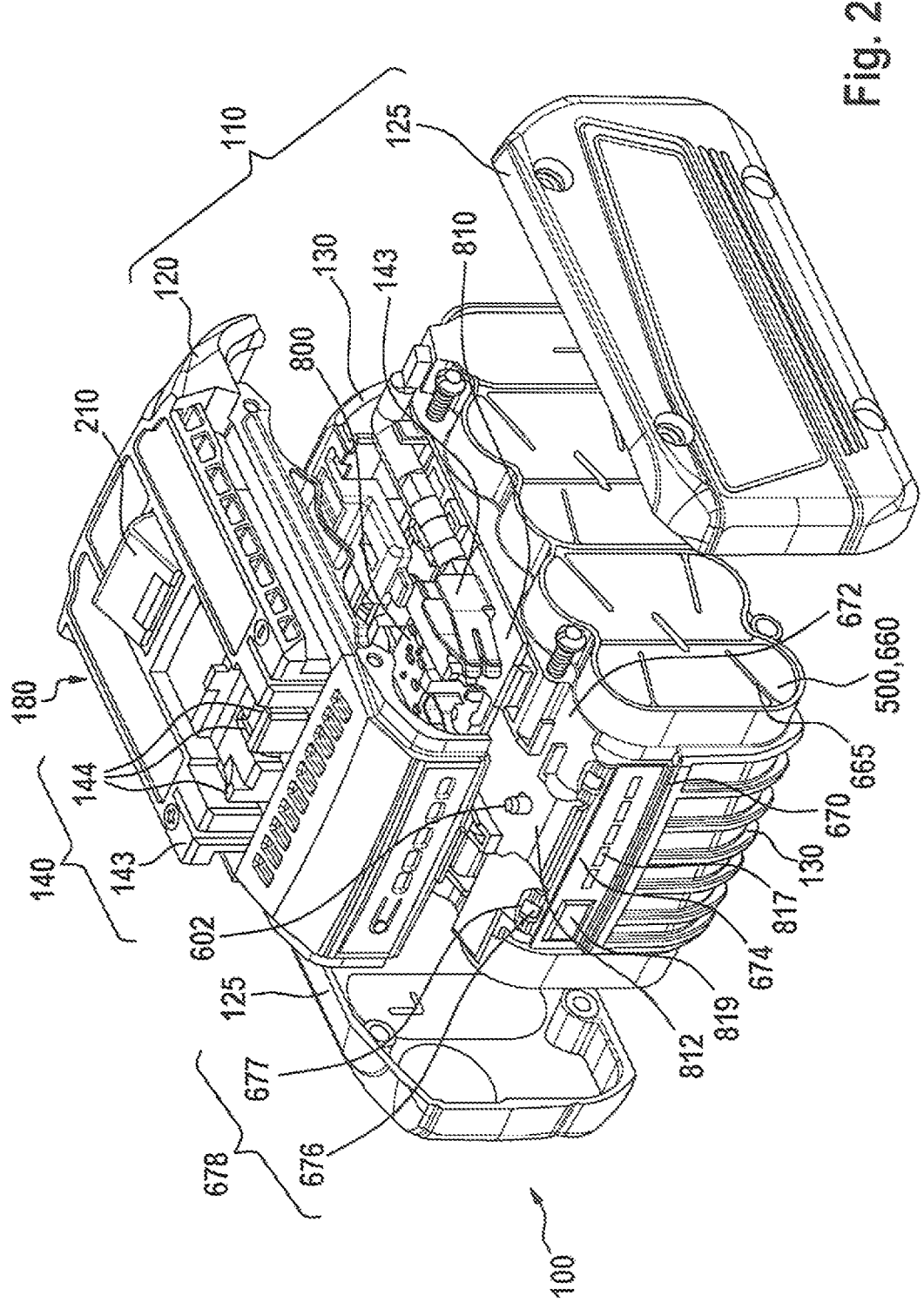
FIG. 2 shows a perspective exploded view of a battery pack according to an example embodiment of the present invention.

FIG. 2 shows a battery pack 100 in an exploded view. Battery pack 100 has a housing 110 made up of a first housing component 120 and a second housing component 130. Here it can be clearly seen that battery pack housing 110 in addition has a cell holder 600 having a plurality of battery cells (not shown in detail) connected in a series circuit, second housing component 130 immediately forming cell holder 600. Cell holder 600 is positioned between the two housing components 120, 130. Battery pack housing 110 additionally has two side components 125 that, in the assembled state, hold together first housing component 120 and second housing component 130, or cell holder 600, in such a way that detachment of first housing component 120 from second housing component 130, or vice versa, is prevented. Battery pack 100 is realized as a sliding battery pack in the variant embodiment shown in FIG. 2.

Figure 5:
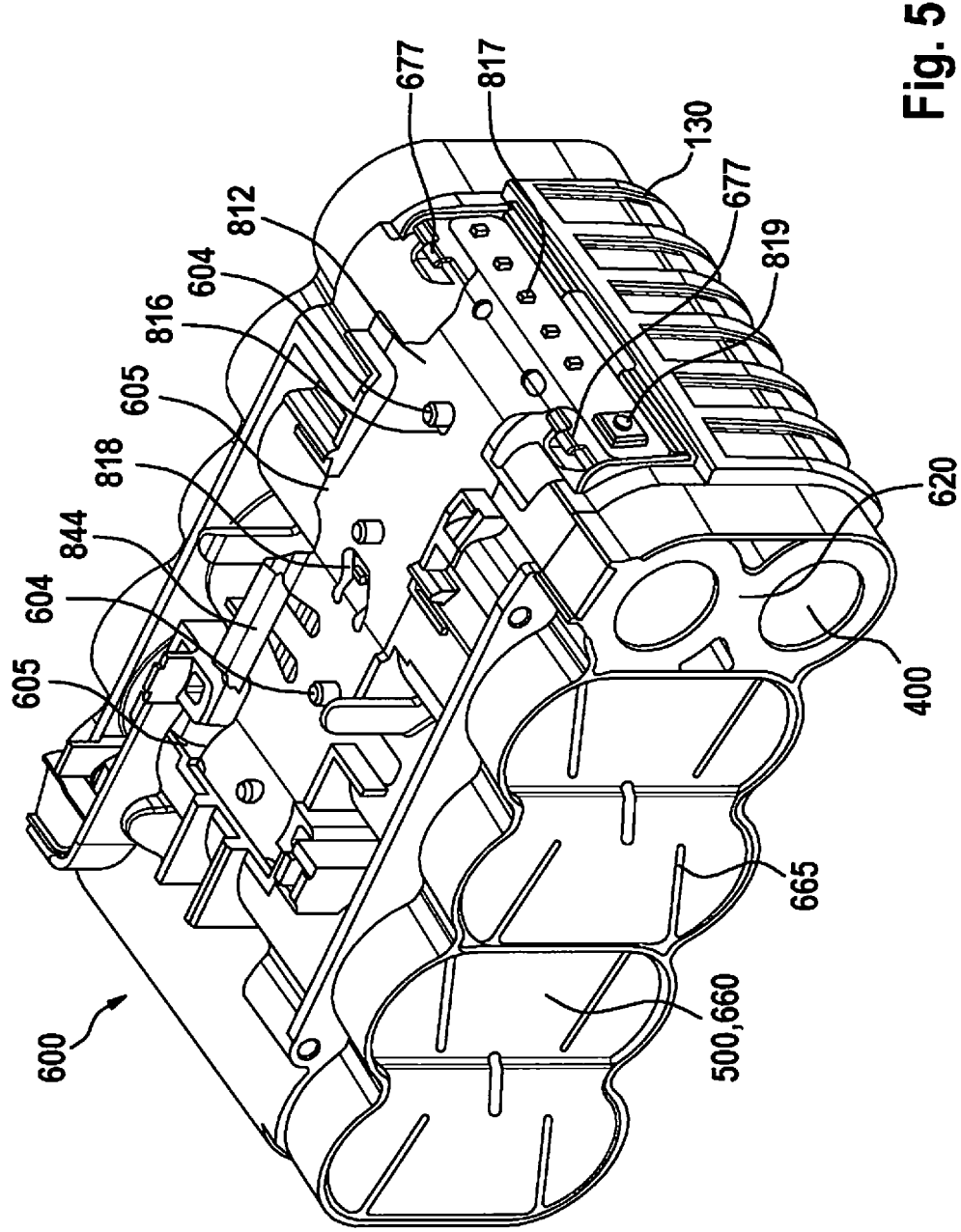
FIG. 5 shows a perspective view of the cell holder of FIG. 4 having the installed flexible circuit board of FIG. 2, according to an example embodiment of the present invention.

The connection of battery cells 400 to one another is realized via cell connectors 500, shown in particular in FIGS. 2 and 5, via which an electrical connection of battery cells 400 among one another in parallel and/or in series can be carried out. Advantageously, cell connectors 500 are already situated on flexible circuit board 812, so that a contacting of the individual battery cells 400 with battery pack electronics unit 800 via additional conductors can be omitted. Here, the individual battery cells 400 are accommodated at a distance from one another in cell holder 600 for the mechanical fixing. Each battery cell 400 has a cladding surface that runs parallel to a longitudinal axis x, the cladding surface being bounded by two end faces that stand perpendicular to longitudinal axis x, and on which the electrical poles of battery cells 400 are situated.

Figure 4:
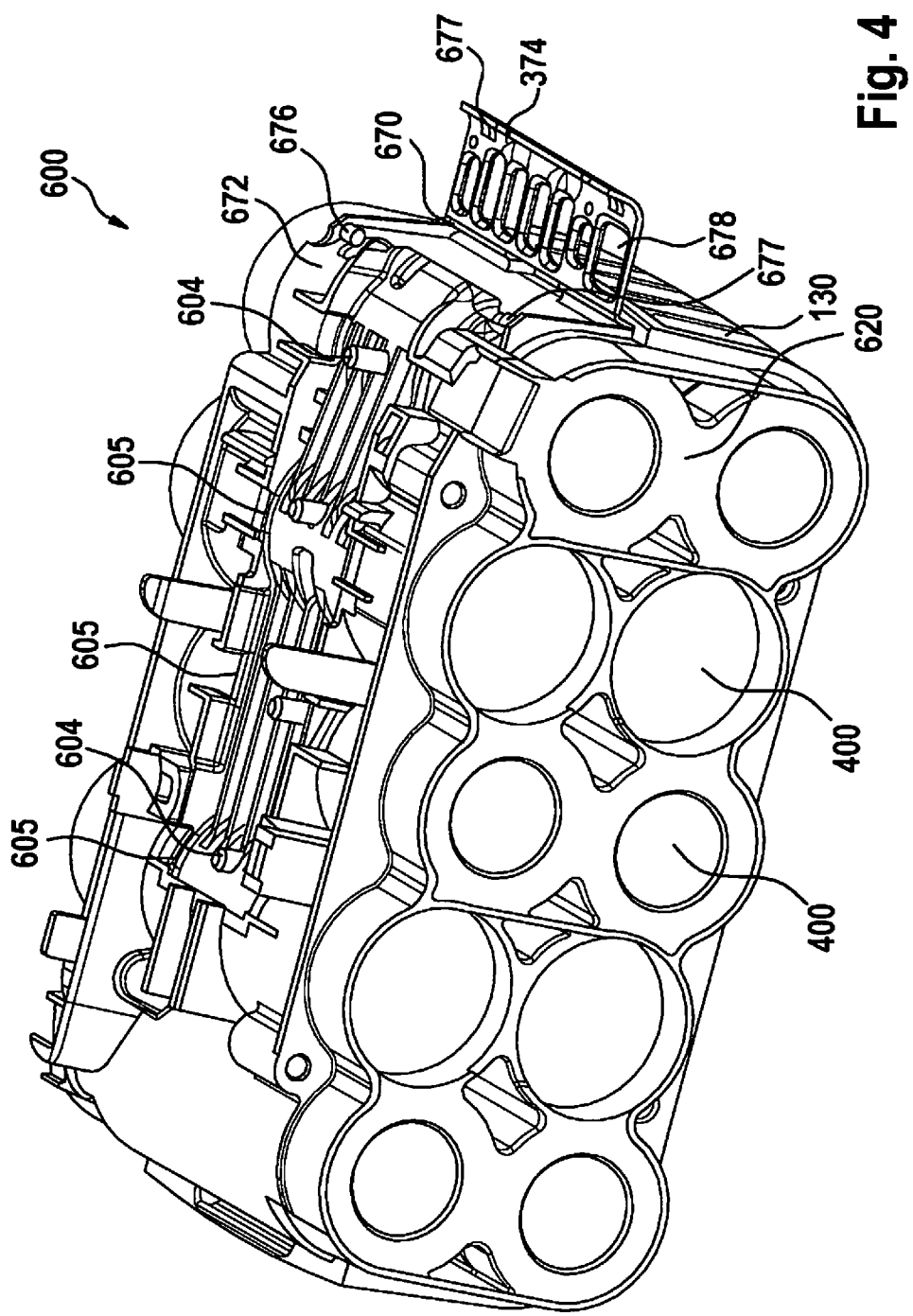
FIG. 4 shows a perspective view of a cell holder for a battery pack according to an example embodiment of the present invention.

It is advantageous if, as shown in FIGS. 2, 4, and 5, cell holder 600 forms in some regions an external side of battery pack housing 110, in particular forming second housing component 130. In addition, it is advantageous if side components 125 are made of the same material as the rest of battery pack housing 110, preferably a synthetic technically usable thermoplastic material, such as a polyamide. In this way, costs can be reduced and the assembly outlay can be kept low. Alternatively, side components 125 can be made at least partly of a metal, preferably die-cast aluminum or magnesium; in this case, an adequate, or reliable, insulating insert, for example an elastic thermally conductive element, is to be used between cell connectors 500 and side components 125. The elastic thermally conductive element is advantageously situated between the end faces of battery cells 400 and a wall of battery pack housing 110 running essentially parallel to the end faces of battery cells 400, so that there results a thermal contact with the end faces of battery cells 400, and heat is carried away from battery cells 400 in the direction of the walls of battery pack housing 110. The elastic thermally conductive element is advantageously made at least partly of a heat-conducting material that belongs to at least one of the material groups of the elastomers, the thermoplastic elastomers, or the carbon fibers. In this way, it can be ensured that the elastic thermally conductive element on the one hand has a thermal conductivity that is greater than 0.15 W/mK, preferably greater than 0.20 W/mK, and particularly preferably is between 0.20 W/mK and 0.50 W/mK, and on the other hand has a Shore hardness that is less than 50 Shore A and is preferably between 20 Shore A and 45 Shore A.

In the specific embodiments shown in FIGS. 2 and 5, it can in addition be seen that in the region of the end faces of battery cells 400, between the elastic thermally conductive element and the wall of battery pack housing 110, cell conductors 500 are made with a large enough surface that, in addition to their function of ensuring an electrical connection of battery cells 400 among one another in a parallel and/or series circuit, also perform a function of a thermal expansion element 660, and are capable of supporting the desired heat transfer. Although it is not shown in detail in the figures, it is advantageous for thermal expansion element 660 and cell connector 500 to be made as a composite component, in particular a one-piece composite component, and to have slot-shaped openings 665 in the regions in which the heat transfer is undesirable and is to be prevented to as great an extent as possible, one opening 665 being provided for each battery cell 400 in the depicted specific embodiment. In this way, it can be ensured that the lost heat transmitted at points from battery cells 400 to cell connectors 500, or to thermal expansion element 660, can be transferred immediately to the elastic element standing in thermal contact with cell connectors 500. Due to openings 665, thermal expansion element 660 distributes the lost heat, transmitted at points, to the entire surface of the respective side components 125 of battery pack housing 110, thermal expansion element 660 also standing in immediate thermal contact with the respective side component 125.

Cell holder 600 is responsible for both the fixing of battery cells 400 in battery pack housing 120, 130 and the cooling of battery cells 400, and is made of a thermally conductive material, for example aluminum or a plastic. As can be seen in particular in FIG. 4, cell holder 600 additionally has sleeve-shaped insulating walls, so that the individual battery cells 400 can be separated, and an electrical insulation of the individual battery cells 400 from one another can be ensured. The heat transfer resistance between adjacent battery cells 400, and between battery cells 400 and cell holder 600, is here as low as possible, so that the lost heat produced by battery cells 400 can be effectively conducted to the outside, and overheating in the interior of the battery pack can be prevented.

In the depicted example embodiment, cell holders 600 have at least one foldable hinge 670 that connects a first element 672 to a second element 674, first element 672 and second element 674 being made in one piece and pivotable relative to one another, as film hinge 670. Film hinges 670 can be used during the assembly of battery pack 100 as assembly aids, in particular as positioning and holding aids, so that for example circuit boards 810, 812, cable guides, cell connectors, fuses, and/or other electronic components can be positioned detachably and/or permanently in their position on battery pack 100, or inside battery pack housing 110.

In the example embodiment shown in FIG. 2, it can in addition be seen that inside battery pack housing 110, a circuit board 810 having a battery pack electronics unit 800 is fastened on the surface of cell holder 600. Contact elements 140, for creating the electrical and mechanical connection between battery pack 100 and handheld power tool 300, or between battery pack 100 and the charge device, are situated on circuit board 810. Here, contact elements 143 are fashioned as voltage contact elements, and act as charge and/or discharge contact elements, whereas contact elements 144 are fashioned as signal contact elements, and are used for the signal transmission from battery pack 100 to handheld power tool 300, or to the charge device, and/or from handheld power tool 300 or from the charge device to battery pack 100. In a manner not shown, contacts 140 are connected to further electronic units attached on circuit board 810, for example a microcontroller (not shown), in order in this way to enable a monitoring and/or controlling of battery cells 400, for example individual voltage monitoring of battery cells 400. Battery pack electronics unit 800 has in addition a flexible circuit board 812, shown in particular in FIG. 3, having a plurality of contacts 840 that are advantageously fastened on cell holder 600 in such a way that, as shown in the example embodiment shown in FIG. 2, are clamped between first element 672 and second element 674 of hinge 670. Flexible circuit board 812 is also connected to the microcontroller (not shown).

Circuit boards 810, 812 are made in general of a base material that has a multiplicity of individual printed conductors or contact surfaces 802. Contact surfaces 802 are usually protected by a protective layer 804, for example a solder resist, that extends over the entire circuit board surface with the exception of terminal contacts 840. Circuit boards 810, 812 are suitable as bearers for electronic components, and in general are provided with protective layer 804 on the free contact surfaces 802 and in the copper-lined bores, directly after the production of the contact surfaces or printed conductors 802; protective layer 804 is intended to guarantee that all terminal contacts 840 that are to be formed during the equipping satisfy all demands both electrically and mechanically.

Flexible circuit board 812 has a bending stiffness that at least in some regions is made such that a bending deformation of flexible circuit board 812 is possible at least in some regions in the installed state. The bending deformation of flexible circuit board 812 can take place in such a way that a midplane of circuit board 812 is deformed in a region of bending deformation 843 by an angle φ relative to an original position in each case. In this way, flexible circuit board 812 can be variably adapted to the geometrical shape of battery pack housing 110, or of cell holder 600, as shown in FIG. 5. In order to ensure a positional securing of flexible circuit board 812 on cell holder 600, cell holder 600 has a plurality of positioning elements 604. In the installed state, positioning elements 604 engage in corresponding recesses 816 of flexible circuit board 812.

Figure 3:
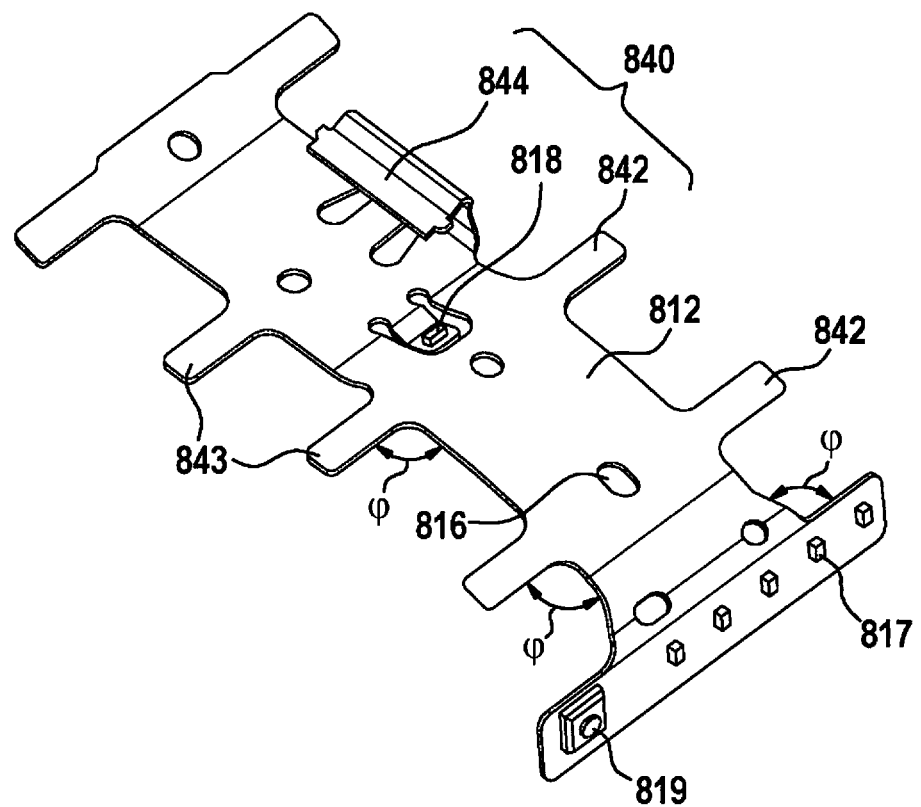
FIG. 3 shows a perspective view of a flexible circuit board according to an example embodiment of the present invention.

As is shown in particular in FIG. 3, flexible circuit board 812 has a plurality of contacts 840 corresponding to battery cells 400. Each contact 840 is provided to electrically contact a corresponding battery cell 400, contact 840 advantageously being fashioned in the form of a bendable contact tongue 842, preferably in the form of two bendable contact tongues 842 situated opposite one another, which, as shown in FIG. 4, are inserted into corresponding openings 602 in cell holder 600.

Figure 6:
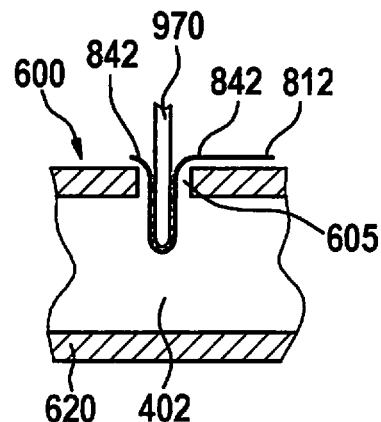
FIG. 6 shows a depiction of an introduction of a contact tongue into the cell holder according to an example embodiment of the present invention.
Figure 7:
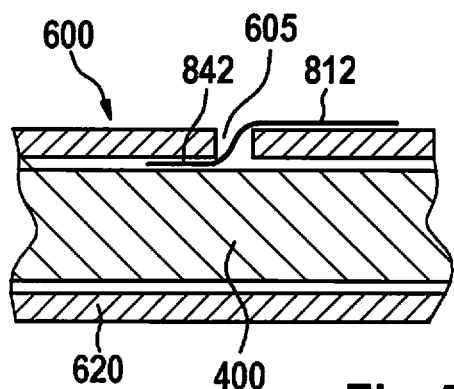
FIG. 7 shows a detailed view of a contact surface of the contact tongue according to an example embodiment of the present invention.

FIGS. 6 and 7 schematically show the introduction of a contact tongue 842 into an opening of a cell holder 600. Contact tongues 842 are introduced into openings 602 of cell holder 600 and into a cell channel 402 with the aid of a tool 970, contact tongues 842 being deformed by the angle φ relative to an original position when battery cells 400 are inserted. After the introduction of battery cells 840 into cell channel 402, contact 840 is clamped between the wall of cell channel 402 and battery cell 400; here, contact 840, or contact tongues 842, can alternatively be welded or soldered to battery cells 400 for the electrical contacting. As shown in FIG. 7, after the introduction has taken place the angle φ has a value of about 180°, a value between 10° and 200°, preferably a value between 30° and 190°, also being possible. The individual battery cells 400 are connected directly to flexible circuit board 812 via contacts 840 or contact tongues 842. In the advantageous example embodiment shown of a flexible circuit board 812, having two contacts respectively situated opposite each other, when battery cells 400 are introduced into cell channel 402 there arises a tension that is equal in both directions on flexible circuit board 600.

Figure 8:
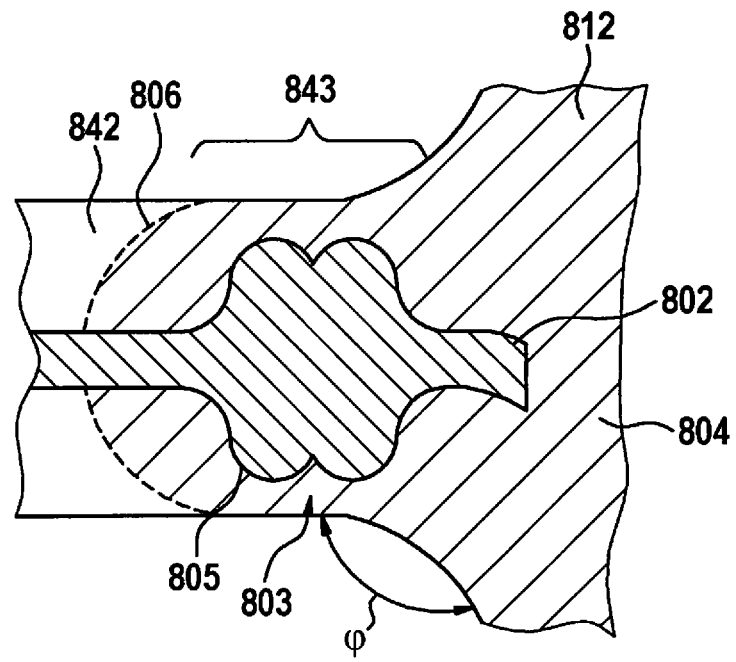
FIG. 8 shows a detailed representation of a cover surface of the contact tongue according to an example embodiment of the present invention.

FIG. 8 shows a schematic detailed view of a contact tongue 842 of a flexible circuit board 812. In the regions of bending deformation 843, contact surfaces 802 have a contact surface 802 that is formed by a metal surface at least in some regions, in particular at the point at which contact tongue 842 is to be bent, contact surface 802 being at least largely electrically insulated by a protective layer 802 at least in the regions of the bending deformation. In this way, contact surface 802 is fashioned to define a mechanical weak point of flexible circuit board 812. For this purpose, in the region of bending deformation 843 contact surface 802 first has a cross-sectional widening 805, then a cross-sectional narrowing 803, and subsequently a cross-sectional widening 805. Broad contact surface 802 provides higher elastic deformation reserves, while cross-sectional reduction 803 defines the mechanical weak point. In this way, contact surface 802 on contact tongue 842 is plastically deformable in the region of bending deformation 843, while remaining largely elastic in the other regions on contact tongue 842 and flexible circuit board 812.

In addition, the transition between a region of contact tongues 842 at which contact surface 802 does not have a protective layer 804 and the region of contact tongue 842 that is provided with a protective layer 804 is realized such that the end 806 of protective layer 804 and the cross-sectional widening 805 of contact surface 802 of contact tongue 842 do not take place at the same location; rather, protective layer 804 partially overlaps contact surface 802 of contact tongue 842. Though not shown in detail, in an advantageous example embodiment, the contour of protective layer 804 is not made in a straight line perpendicular to the longitudinal direction of contact tongue 842, but rather has a curve. In this way, there is no sharp transition of the bending stiffness, and thus also no mechanical weak point. For the same reasons, in an advantageous example embodiment, contact surface 802, situated below the protective layer, does not end along a line running perpendicular to the longitudinal direction of contact tongue 842, but rather along a curved line. In this way, in the longitudinal direction of contact tongue 842 there is on the one hand a gradual increase of contact surface 802, but on the other hand there is also a gradual decrease of protective layer 804.

In an example embodiment that is not shown, it is also possible for cell holder 600 to have, in the region of cell channel 402, an opening corresponding to contact 840 for each battery cell 400, through which the respective contact 840 can be introduced into cell channel 402 in order to contact battery cell 400, whereby contacts 840 contact battery cells 400. In a preferred example embodiment, the quality of the electrical contact can be increased in that battery cells 400 essentially have no insulating sheath, or have an insulating sheath only in some regions, the insulating sheath having at least one opening at least in the region in which contacts 840 contact battery cells 400; in order to reduce a transition resistance between contact 840 and battery cell 400, battery cell 400 can be provided with a conductive and passivating paste.

In addition, a plurality of different electrical components can be positioned on flexible circuit board 812 that are situated in separate spatial locations, such as various actuating elements 819, indicator lights 817, voltage taps, temperature sensors, various functional groups of battery pack electronics unit 800, antennas for a radio module, terminals for a wireless charging module, and/or other surface mounted devices. Surface mounted devices, or SMD, make it possible to increase the equipping density on a circuit board 810, 812, and to expand them almost arbitrarily, e.g., with a connection of an inductive charging module having additional current and signal lines. Thus, through the present invention, the complexity of the cabling and/or the number of solder connections inside battery pack housing 110 can be reduced, thus reducing assembly outlay and therefore costs, and making battery pack 100 more robust and longer-lived.

In addition, the individual voltage monitoring is connected in each case to battery pack electronics unit 800 via an input filter (not shown) that contains an electrical resistance. A flexible circuit board enables equipping with various surface mounted devices, and with the mentioned input filter resistors or a sensing device as actuating element 819, and/or indicator lights, for example in the form of LEDs 817.

Second element 674 has a plurality of viewing areas 679, so that the indicator lights 817 situated on flexible circuit board 812 are visible through these areas after flexible circuit board 812 has been assembled between first element 672 and second element 674; in this way, for example various charge states of battery cells 400 can be displayed.

In addition to the described and depicted specific embodiments, further specific embodiments are conceivable that can include further modifications, as well as combinations of features.

What is claimed is:

1. A battery pack for a handheld power tool, the battery pack comprising:
    a battery pack housing;
    at least one cell holder for housing at least one battery cell; and
    a battery pack electronics unit that includes at least one flexible circuit board, wherein the at least one flexible circuit board is positioned partially between the at least one cell holder and the battery pack housing,
    wherein the at least one flexible circuit board has at least one contact which corresponds to the at least one battery cell, wherein the at least one contact includes at least one bendable contact tongue situated opposite one another, wherein the at least one bendable contact tongue is inserted into an opening of the at least one cell holder,
    wherein the contact tongue is elastically deformable to thereby reduce a contact surface in a region at which the contact tongue is elastically deformed,
    wherein the contact surface is a metal surface that is at least partially electrically insulated by a protective layer at least in the region at which the contact tongue is elastically deformed,
    wherein the protective layer partially overlaps the contact surface of the contact tongue.

2. The battery pack of claim 1, wherein the circuit board is bendable.

3. The battery pack of claim 2, wherein the flexible circuit board, in at least some regions, has a bending stiffness such that, in an installed state of the circuit board, the circuit board can be deformed to include one or more bending deformations.

4. The battery pack of claim 2, wherein the flexible circuit board, in at least some regions, has a bending stiffness such that, in an installed state of the circuit board, a midplane of the circuit board can be deformed by an angle relative to an original position, thereby forming a bending deformation.

5. The battery pack of claim 4, wherein the angle has a value between 10° and 200°.

6. The battery pack of claim 4, wherein the angle has a value between 30° and 190°.

7. The battery pack of claim 4, wherein the angle has a of 180°.

8. The battery pack of claim 1, wherein the contact is configured to electrically contact the respective battery cell for individual voltage monitoring of the respective battery cell.

9. The battery pack of claim 8, wherein the contact is formed as two bendable contact tongues situated opposite each other.

10. The battery pack of claim 1, wherein the contact tongue is insertable with a tool into the opening in the at least one cell holder.

11. The battery pack of claim 1, wherein the contact tongue is elastically deformable to form a region of bending deformation that includes a contact surface, the contact surface defining a mechanical weak point of the flexible circuit board.

12. The battery pack of claim 1, wherein the cell holder has at least one opening for guiding the contact tongue through into the cell holder.

13. The battery pack of claim 1, further comprising one or more of the at least one battery cell, wherein the contact tongue is clamped, welded, or soldered to a respective one of the one or more battery cells, thereby providing the electrical contact between the respective contact and the respective battery cell.

14. The battery pack of claim 1, wherein the flexible circuit board includes two or more of the following: one or more actuating elements, one or more indicator lights, and one or more temperature sensors.

15. The battery pack of claim 1, wherein the flexible circuit board has at least one one-sided conductor structure.

16. The battery pack of claim 1, wherein:
    the flexible circuit board has at least one recess therein;
    the cell holder includes at least positioning element that each engages, in an installed state, in a respective one of the at least one recess thereby securing a position of the flexible circuit board relative to the cell holder.

17. The battery pack of claim 1, further comprising at least one of the following mounted on the flexible circuit board: one or more filter resistors, one or more LEDs, and one or more sensing devices.

18. The battery pack of claim 1, further comprising at least one surface mounted device (SMD) mounted on the flexible circuit board.

19. The battery pack of claim 1, wherein the contact tongue is positioned between the battery cell and the cell holder.

20. The battery pack of claim 1, wherein the flexible circuit board is directly connected to the individual battery cell via the contact tongue.

21. A device comprising:
    a battery pack; and
    a handheld power tool that includes:
    a housing that includes a handle;
    a mechanical interface;
    a drive motor in the housing and configured to drive the mechanical interface; and
    a first electronics unit in the housing;
    wherein the battery pack is detachably connected to the housing and is electrically connected to the handheld power tool in an installed state in which the battery pack is connected to the housing,
    wherein the battery pack includes:
    a battery pack housing;
    at least one cell holder for housing at least one battery cell; and
    a battery pack electronics unit that includes at least one flexible circuit board, wherein the flexible circuit board, in at least some regions, has a bending stiffness such that, in an installed state of the circuit board, a midplane of the circuit board is deformed by an angle relative to an original position, thereby forming a bending deformation, at least one contact which corresponds to the at least one battery cell, wherein the at least one contact includes at least one bendable contact tongue situated opposite one another, wherein the at least one bendable contact tongue is inserted into an opening of the at least one cell holder such that the at least one contact is clamped between a wall of the at least one cell holder and the at least one battery cell
    wherein the contact tongue is elastically deformable to thereby reduce a contact surface in a region at which the contact tongue is elastically deformed, wherein the contact surface is a metal surface that is at least partially electrically insulated by a protective layer at least in the region at which the contact tongue is elastically deformed, wherein the protective layer partially overlaps the contact surface of the contact tongue.

\* \* \* \* \*